A. S. RUE.
ATTACHMENT FOR HARROWS AND CULTIVATORS.
APPLICATION FILED MAY 19, 1920.
1,365,276.
Patented Jan. 11, 1921.
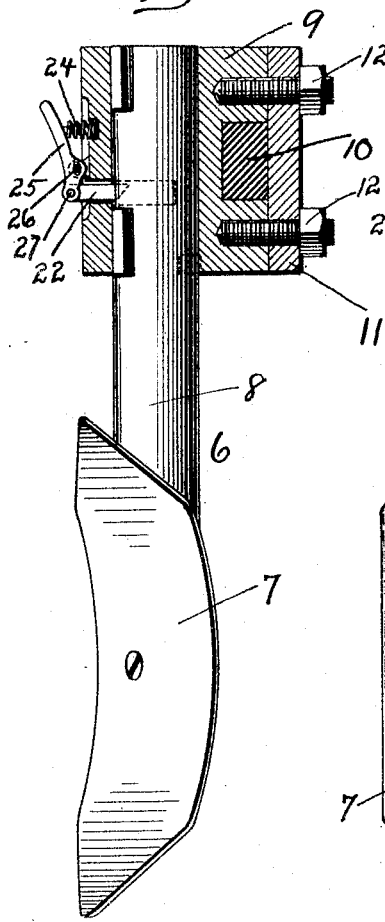
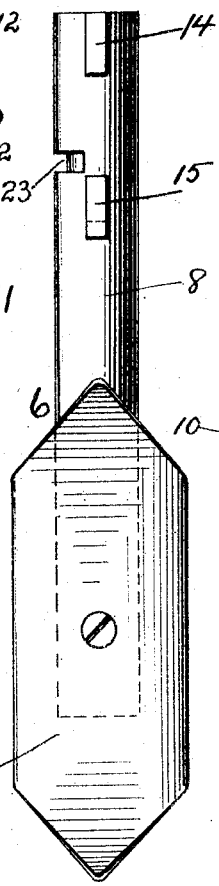
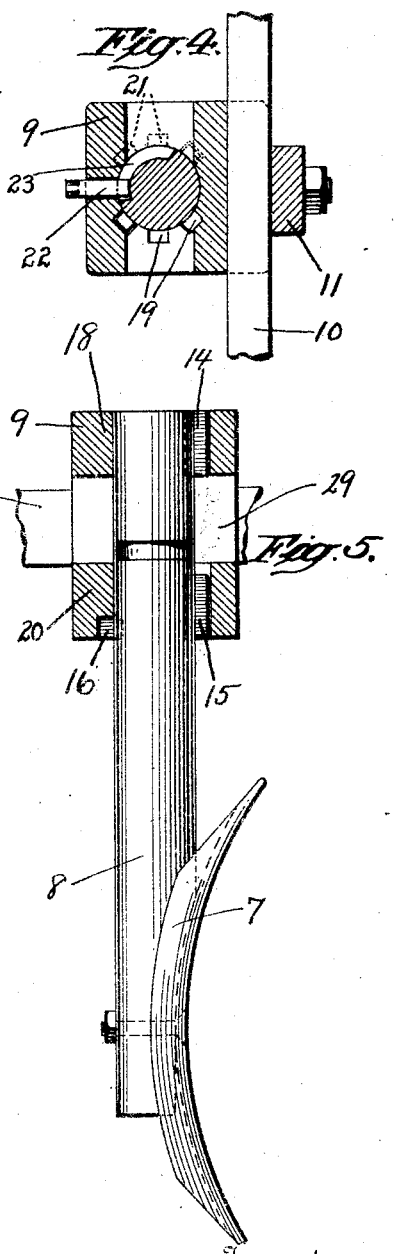
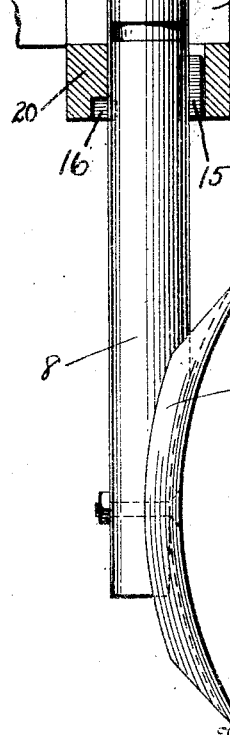
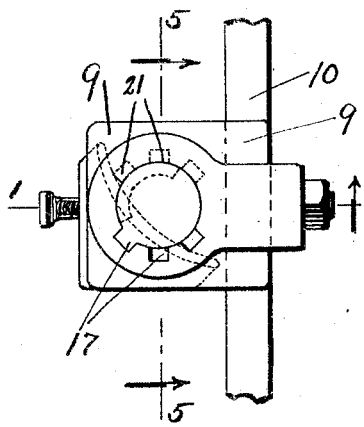
Inventor
Albert S. Rue
By his Attorney
Archibald Cox

UNITED STATES PATENT OFFICE.

ALBERT S. RUE, OF NEW BRUNSWICK, NEW JERSEY.

ATTACHMENT FOR HARROWS AND CULTIVATORS.

1,365,276.     Specification of Letters Patent.     Patented Jan. 11, 1921.

Application filed May 19, 1920. Serial No. 382,542.

*To all whom it may concern:*

Be it known that I, ALBERT S. RUE, a citizen of the United States, residing at New Brunswick, in the county of Middlesex, in the State of New Jersey, have invented certain new and useful Improvements in Attachments for Harrows and Cultivators, set forth in the following specification.

This invention relates to an attachment for harrows and cultivators, and more particularly to an adjustable tooth for harrows and cultivators.

It is sometimes found necessary or desirable to adjust the teeth of a harrow or cultivator angularly on a horizontal plane. As harrows and cultivators with adjustable teeth have heretofore been constructed it has required an unnecessary expenditure of time and effort to adjust the teeth for the purposes in hand. The object of the present invention is to produce an attachment or tooth for harrows and cultivators of such improved construction that when it is applied to the harrow or cultivator it may be adjusted to the desired angle with an expenditure of a minimum of both effort and time. With this object in view the invention consists of the improved attachment for harrows or cultivators hereinafter described and particularly pointed out in the appended claims.

In the accompanying drawings illustrating the preferred form of the invention, Figure 1 is an elevation of the tooth taken at an angle and a vertical longitudinal section through the attachment block taken on line 1—1 of Fig. 2; Fig. 2 is a plan of the parts shown in Fig. 1; Fig. 3 is a front elevation of the tooth without the attachment block; Fig. 4 is a horizontal transverse section through the attachment block; and Fig. 5 is a section taken on the line 5—5 of Fig. 2. The improved attachment or tooth for harrows or cultivators as illustrated in the drawings is generally indicated at 6 and comprises a shovel 7 which enters the ground and a shank 8 to the lower end of which the shovel is attached. The upper end of the shank 8 is adjustably received in an attachment block 9 by which the tooth is attached to the frame of the harrow or cultivator. The attachment block 9 is provided with a longitudinal recess along one side adapted to receive the bar 10 of the frame of the harrow or cultivator. A plate 11 secured to the block 9 by the stud bolts 12 engages the outer side of the bar 10 and serves to secure the block 9 to the frame of the harrow or cultivator.

In order that the tooth may be shifted angularly on a horizontal plane in the attachment block 9 and be held without turning in the adjusted position, the tooth shank 8 is provided on one side of its upper end with an upper key 14, and a lower key 15. A stop key 16 is situated on the opposite side of the tooth shank from the key 15. The upper key 14 is adapted to be received in any one of the upper three recesses 17 in the upper section 18 of the attachment block 9 (see Figs. 2 and 5). The lower key 15 is adapted to be received in any one of the three lower recesses 19 located in the lower section 20 of the block 9 and in registration with the upper recesses 17. The stop key 16 is adapted to be received in any one of the three notches 21 in the lower section of the block. It is thus seen that the harrow or cultivator tooth may have three positions of angular adjustment. It is understood, of course, that by increasing the number of recesses and notches the tooth may have a correspondingly greater number of positions of angular adjustment.

When the keys 14, 15 and 16 are in their corresponding recesses and notches the tooth is effectively held against turning movement. In order that the tooth may not drop out of the attachment block, the block is provided with means for engaging the shank of the tooth to hold it in the block. In order that quick attachment of the tooth may be secured this holding means is so constructed that a single movement releases it from the shank of the tooth, thereby freeing the tooth so that it may be adjusted to the desired angular position. This holding device comprises a holding pin 22, the forward end of which is adapted to enter a transverse recess 23 formed in the tooth shank. The pin 22 is normally pressed into the groove 23 by means of a spring 24 received in a recess in the block 9. The spring 24 engages a thumb piece 25 pivotally connected with the block 9 and pivotally connected with the pin 27. The construction of the parts just described is such that when the thumb piece 25 is pressed toward the block 9 the pin 22 is released from the groove 23 so as to permit the tooth to be adjusted in the block and when the tooth is in its adjusted position and the thumb piece 25 is released, the spring 24 presses the pin into the groove 23 to hold the tooth in an adjusted position.

When it is desired to change the angular position of the tooth the operator presses the thumb piece 25, thereby releasing the holding pin 22 from the groove 23. The tooth shank 8 is now free to move longitudinally downwardly in the block 9. The adjustment is made by pulling the tooth out of the block 9 until the lower key 15 is free of the recess it occupied in the section 20 and the key 14 is free of the corresponding recess in the upper section 18 of the block. It is not necessary to remove the tooth entirely from the block because the middle open section 29 of the block is sufficiently large to permit the key 14 to turn therein. When the tooth has been turned to the desired angle the keys 14 and 15 enter the appropriate recesses and the key 16 enters the appropriate notch. By coming in contact with the upper end of these notches the key 16 limits the upward movement of the tooth in the block and thereby brings the groove 23 opposite the end of the pin 22.

It will be recognized from the above description that the present invention provides a simple and efficient means by which the teeth of harrows or cultivators may be quickly adjusted in their angular positions and when so adjusted effectively held. It will be understood that the invention is not to be limited to the precise form shown and described but that it may be embodied in other forms within the spirit of the following claims:

Having thus described the invention what I claim as new is:

1. An attachment for harrows and cultivators comprising a tooth having a shank provided with keys, a block adapted for attachment to the frame of the harrow or cultivator and provided with recesses to receive the keys on the tooth shank so as to hold the tooth in adjusted angular position, said block being provided with spring-pressed means for engaging the tooth shank to hold the tooth against longitudinal movement.

2. An attachment for harrows and cultivators comprising a tooth having a shank, a block adapted for attachment to the frame of the harrow or cultivator, said tooth shank and said block being provided with coöperating means to hold the tooth in different positions of angular adjustment, and means carried by the block for engaging the tooth shank to hold the tooth against longitudinal movement.

3. An attachment for harrows and cultivators comprising a tooth, a block adapted for attachment to the frame of the harrow or cultivator and provided with an opening for receiving the tooth, said block being further provided with recesses for determining the angular position of the tooth, keys on the tooth adapted to enter the recesses to prevent angular movement of the tooth when in adjusted position, and spring-pressed means carried by the block for engaging the tooth to prevent longitudinal movement thereof in the block.

ALBERT S. RUE.